(12) United States Patent
Yasuhara et al.

(10) Patent No.: US 6,548,933 B2
(45) Date of Patent: Apr. 15, 2003

(54) STATOR OF ROTATING ELECTRIC MACHINE

(75) Inventors: Takashi Yasuhara, Yotsukaido (JP); Suetarou Shibukawa, Hitachinaka (JP); Osamu Koizumi, Ibaraki (JP); Hiromichi Anan, Iwama (JP); Syuichi Hara, Shibata (JP); Toshiaki Ueda, Uridura (JP); Yasuhiko Kimura, Hitachinaka (JP); Takefumi Oowada, Hitachinaka (JP); Hidemitsu Kobayashi, Uridura (JP); Hisashi Kondo, Hadano (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/774,093

(22) Filed: Jan. 31, 2001

(65) Prior Publication Data

US 2001/0010442 A1 Aug. 2, 2001

(30) Foreign Application Priority Data

Jan. 31, 2000 (JP) ....................................... 2000-027213

(51) Int. Cl.$^7$ ................................................. H02K 3/00
(52) U.S. Cl. ....................................... 310/203; 310/206
(58) Field of Search .......................... 310/71, 194, 208, 310/214, 42, 43, 91, 218, 260, 270, 201, 203; 29/596–598, 335, 733–735

(56) References Cited

U.S. PATENT DOCUMENTS

| | | | | | |
|---|---|---|---|---|---|
| 4,321,497 A | * | 3/1982 | Long | ............................ | 310/208 |
| 4,649,308 A | * | 3/1987 | Kranzler | ...................... | 310/214 |
| 5,063,320 A | * | 11/1991 | Watanabe et al. | ............ | 310/270 |
| 5,196,752 A | * | 3/1993 | Palma | .......................... | 310/260 |
| 5,270,598 A | * | 12/1993 | Holly, III et al. | .............. | 310/71 |
| 5,422,526 A | * | 6/1995 | Kawabata et al. | ........... | 310/201 |
| 5,619,088 A | * | 4/1997 | Yumiyama et al. | .......... | 310/270 |
| 5,623,178 A | * | 4/1997 | Kawabata et al. | ........... | 310/260 |
| 6,201,332 B1 | * | 3/2001 | Umeda et al. | ............... | 310/184 |
| 6,252,327 B1 | * | 6/2001 | Matsuzaki | .................... | 310/201 |
| 6,278,213 B1 | * | 8/2001 | Bradfield | ..................... | 310/201 |

* cited by examiner

Primary Examiner—Tran Nguyen
(74) Attorney, Agent, or Firm—Crowell & Moring LLP (57) ABSTRACT

A linear shape straight angle line is transformed to form U-shape configuration in advance and by sandwiching a stator tooth portion to adjacent slots linear shape two sides are inserted and using a thin plate rod shape chip between both ends of U-shape side of the above stated coil is connected and then the coil is formed to have one winding close circuit. The plural coils are inserted and as stated in above between the both ends of an anti-U-shape side is connected, and a stator coil for forming a predetermined winding turn number is obtained. When an end face of the anti-U-shape side and the thin plate shape chip are overlapped and connected, a plate thickness of a portion in which they are overlapped is reduced by half respectively, and when they are overlapped, it becomes the plate thickness which corresponds to a plate thickness of the above stated straight angle line coil. A length of a coil end portion can be shortened widely.

5 Claims, 14 Drawing Sheets

STATOR OF ROTATING ELECTRIC MACHINE

BACKGROUND OF THE INVENTION

The present invention relates to a stator of a rotating electric machine and particularly to a stator suitable for a synchronous electric machine.

Figure 21:
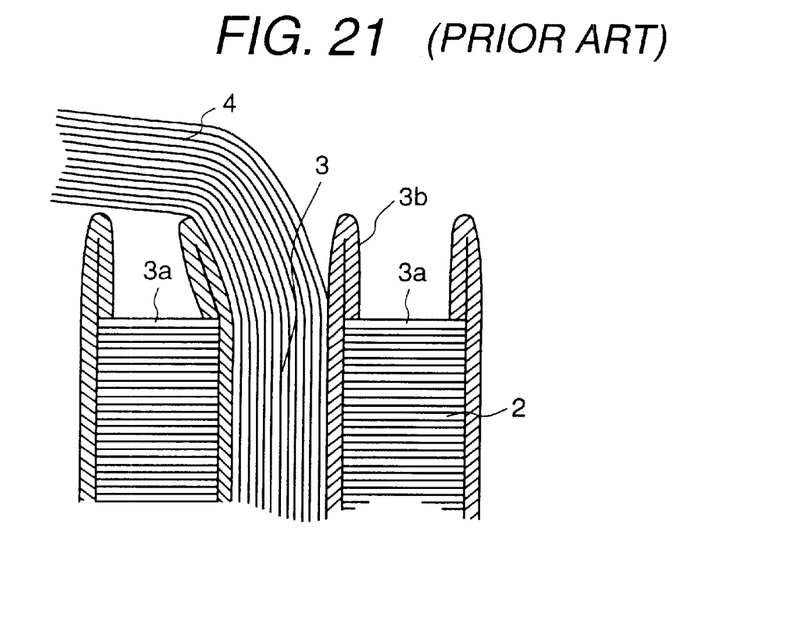
FIG. 21 is an explanatory view showing a prior art stator.

In a stator of a rotating electric machine such as a synchronous electric machine, in generally, as shown in FIG. 21, the stator is formed by using a stator iron core 2 having a tooth portion 3a which is arranged in a circumferential direction and a slot 3 between the tooth portions 3a. On the slot 3 an insulating slot liner 3b (hereinafter called "a slot liner") is mounted, and in an interior portion thereof a predetermined wound transformed coil 4 is inserted and similarly to a predetermined wedge 3c is mounted.

Figure 3:
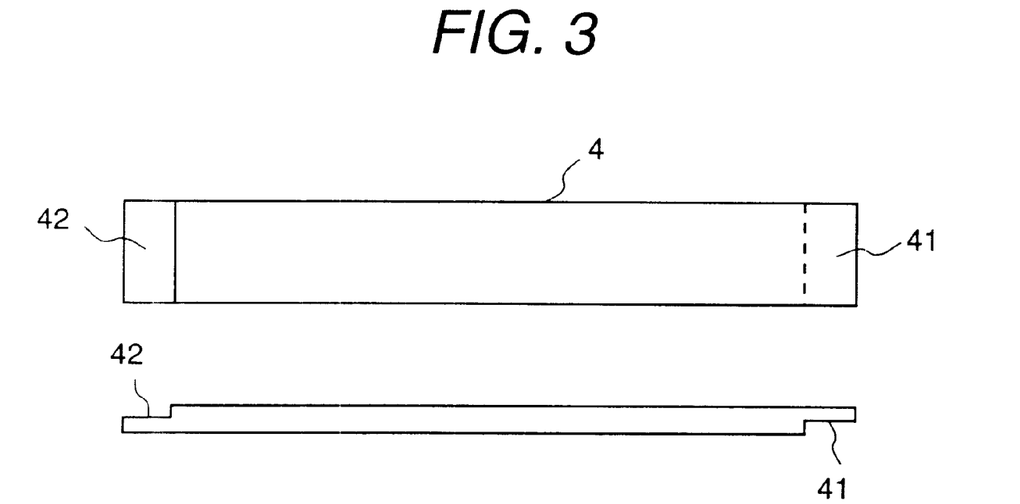
FIG. 3 is an explanatory view for explaining the embodiment for carrying out a stator coil according to the present invention.
Figure 22:
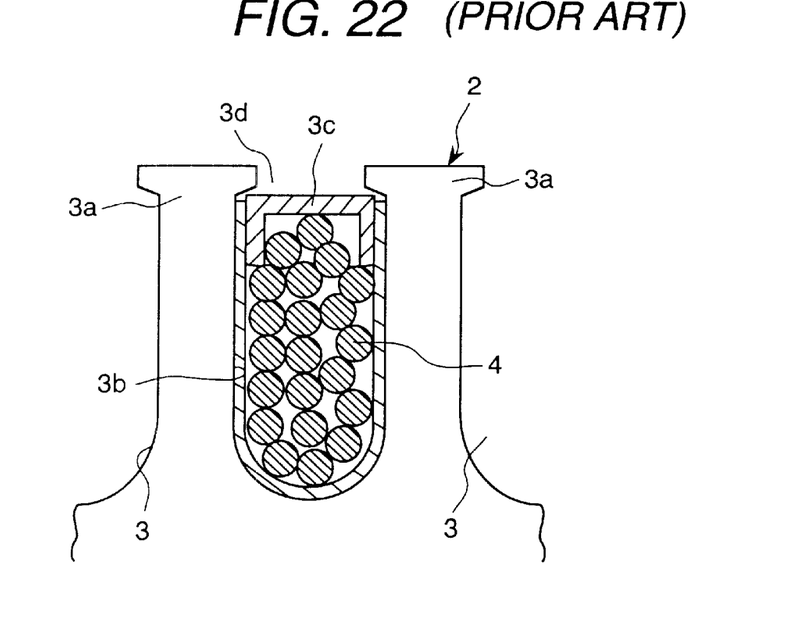
FIG. 22 is an explanatory view showing another prior art stator.
Figure 23:
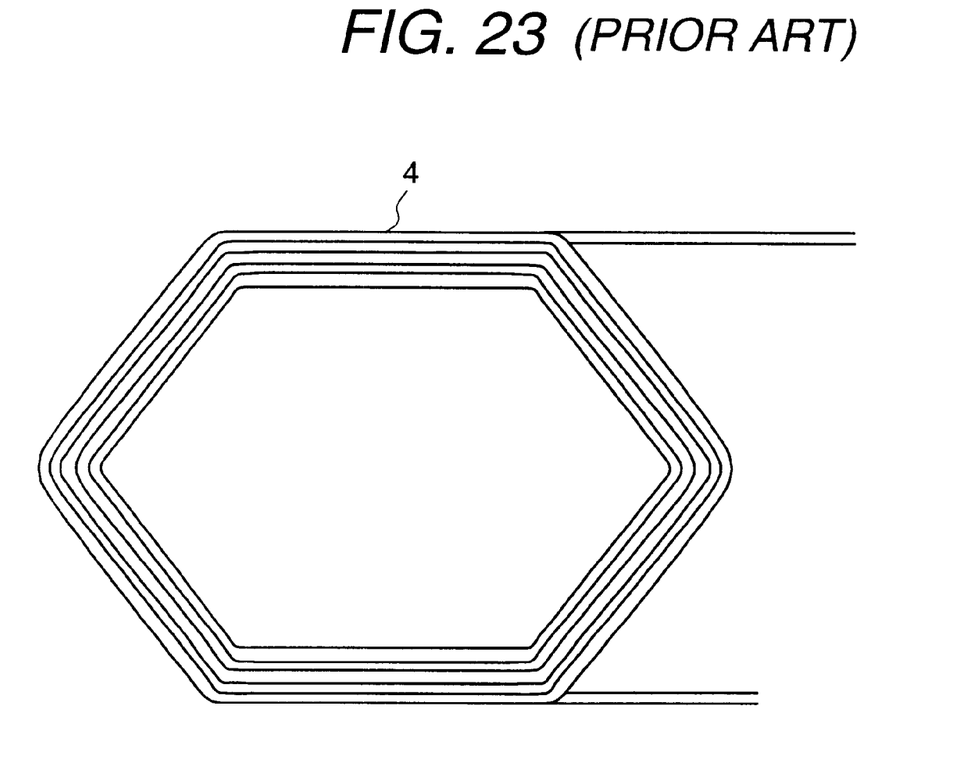
FIG. 23 is an explanatory view for showing a prior art coil.

Further, FIG. 22 shows a cross-section of the inner portion of the slot 3. On the other hand, a stator coil 4 has a shape configuration shown in FIG. 23 and the stator coil 4 is formed in a manner in which a winding frame not shown in figure which has a substantially similar shape as the shape of the stator coil 4 is formed in advance and to this winding frame the coil 4 is wound in a predetermined turn number. And the above stated stator coil 4 is inserted into the interior portion 3a of the slot 3 from an opening portion of the slot 3 using a mutual working technique or a machine apparatus.

However, the prior art does not take fully into consideration the shortening of the length of a coil end portion, and accordingly, there is a problem about the small size of the rotating electric machine.

The problem of the lengthening about the length of the coil end portion in the prior art will be explained as follows.

The stator coil 4 has a predetermined number of slot straddling (hereinafter it is called as "straddling") which is determined by a number of poles of the stator, and the length of the coil end is put under the control of the size of the straddling.

In general, when the number of the poles is large, since the straddling of the coil is small, the length of the coil end becomes short in comparison with the small number of the poles. Further, in accordance with the device of the shape configuration of the coil end portion of a winding frame which is used during the winding working of the coil, then the length of the coil end can be formed short to some degree.

However, when the length of the coil end is short widely, to the coil end of the coil which has been inserted, the coil end which is to be inserted interferes, and then it is impossible to carry out the insertion of the coil.

Heretofore, the length of the coil has been made no more than the length which does not disturb the coil insertion during the coil winding time. After all of the coil insertion has been finished, using an outside force the coil end is transformed compulsively to an axial direction and a radial direction and is shortened.

According to the above, since the coil end is transformed using a large mechanical force, the slot liner and a coil covering enamel insulation are injured. It is thus possible to carry out the voltage withstanding failure of the stator and further even the compulsive transformation performance, but there is a limitation about the shortening of the coil length. Accordingly, the prior art approach does not correspond to the present desire of users.

SUMMARY OF THE INVENTION

An object of the present invention takes into consideration the problem with the above stated prior art technique and provides a stator of a small size rotating electric machine in which a length of a coil end portion of a stator coil can be shortened.

According to the present invention, the coil is not formed by the winding which is as shown in the prior art, within four sides which constitute a closed circuit of the coil, only a radial direction component portion of one side is separated, and the leaving three sides are formed with U-shape configuration and after they are inserted into the slots, between anti-U-shape side opening ends is connected by the radial direction component portion of the one side and then the coil is formed as the closed circuit and is with a predetermined winding turn number.

Further, to attain the full and good connection, when the anti-U-shape side opening end and the radial direction component portion, in other words the thin plate rod chip are overlapped and they are connected, a plate thickness of the overlapped portion of the both are reduced by half respectively in advance, the plate thickness in which the both are overlapped is formed to correspond the plate thickness of the coil.

For this reason, a face in which the plate thickness is reduced half, in the U-shape coil, one end of the anti-U-shape side, for example, in a left side, is formed a face which directs for an inner diameter of the stator and a right side end is formed to a face which directs for an outer diameter of the stator. On the other hand, in the thin rod shape chip, the face in which the plate thickness is reduced by half is formed a face which is an anti-face against the coil.

The coil is formed with the above stated construction, when they are overlapped, according to the linear portion two sides of the U-shape coil, the thin plate rod shape chip is functioned to be sandwiched, and a full and solid connection can be realized.

When the coil is constituted with the above construction, since a straddling width of the coil is determined by the adjacent slot widths, an axial direction length of the U-shape component portion which projects from a stator iron core becomes to correspond the adjacent slot widths.

On the other hand, in the anti-U-shape side of the coil since an axial direction length of the component portion which projects from the stator iron core is connected by the thin plate rod shape chip, in the axial direction it occupies only the corresponded width of the above stated thin plate connection chip, accordingly the coil in which the length of the coil end portion can be shortened surely can be provided.

DESCRIPTION OF THE INVENTION

Hereinafter, a stator of a rotating electric machine according to the present invention will be explained in detail referring to an illustrated carrying-out embodiment.

Figure 1:
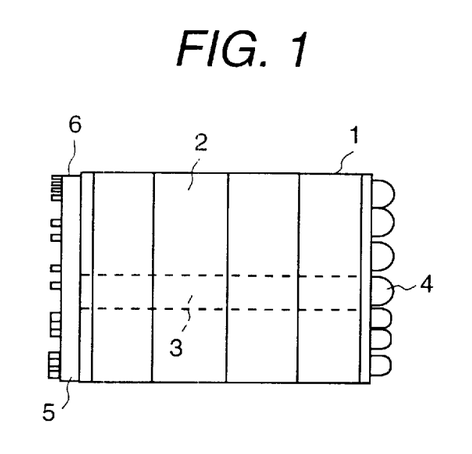
FIG. 1 is a front view showing one carrying-out embodiment of a stator of a rotating electric machine according to the present invention.

FIG. 1 shows one embodiment of a stator of a rotating electric machine according to the present invention and is a front view of a stator 1 into which to a slot 3 of a stator iron core 2 a stator coil 4 is inserted.

Figure 2:
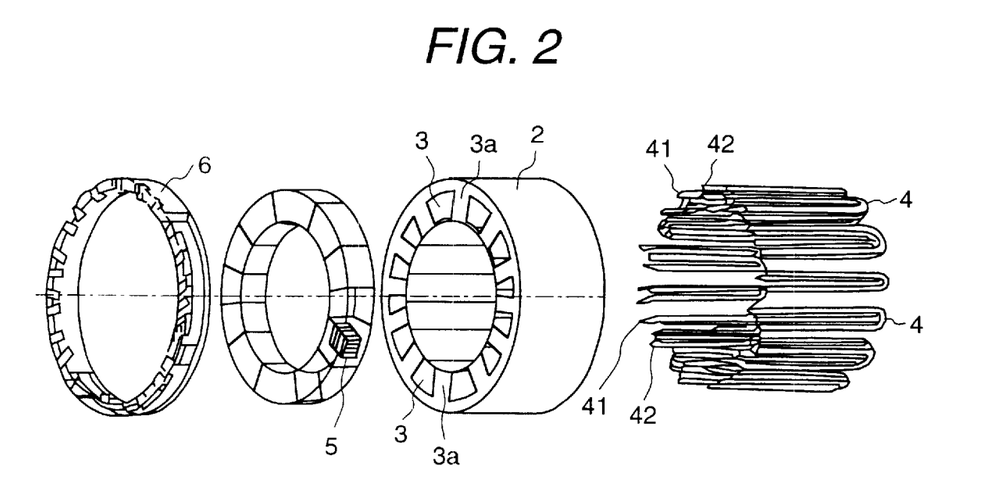
FIG. 2 is a bird's-eye view for explaining the embodiment for carrying out the stator of the rotating electric machine according to the present invention.

FIG. 2 is a bird's-eye view of an assembly of components for constituting the stator 1 according to the present invention, in which stator 1 a predetermined number of the stator coil 4 is to be inserted into to the stator iron core 2 and into the plural slots 3 which are provided on the stator iron core 2.

The stator coil 4 is transformed in advance to form a U-shape configuration and by sandwiching a stator tooth portion 3a to the adjacent slot linear two sides are inserted and using a thin plate rod shape chip 5 between a face 41 of a side opposite the bight end and a face 42 is connected to form one winding close circuit.

Further, to constitute the coil having a predetermined winging turn number, in the slot this coil is piled up with a predetermined number and when using the thin plate rod shape chip the coil is connected, at one end of the straight leg of the U shape coil, in other words when the coil is seen from the side opposite the bight portion, and when the right side is an inlet of the current, the left side of the U shape coil which is positioned at just above an outer diameter direction of this coil and the left side of the above stated coil are connected using the thin plate rod shape chip 5.

Next, to constitute a complete coil to form a predetermined connection circuit, for example, as to a connection of a cross-over which becomes a neutral point by forming as three phases U-phase, V-phase, W-phase with Y connection, a previously completed connection ring 6 is connected to the thin plate connection chip 5 so that the stator coil has a desired connection, and accordingly, the stator is completed.

Next, a manner for obtaining a stator according to the embodiment shown in FIG. 2 will be explained in detail hereinafter. FIG. 3 shows one example of a configuration of the stator coil 4. In the stator coil 4, using the straight angle lines a plate thickness at a portion in a vicinity of the both end faces are reduced by half by making the faces different as shown in a face 41 and a face 42. Namely, the face 41 is formed in a lower face of the stator coil 4 and the face 42 is formed in an upper face of the stator coil 4.

Figure 4:
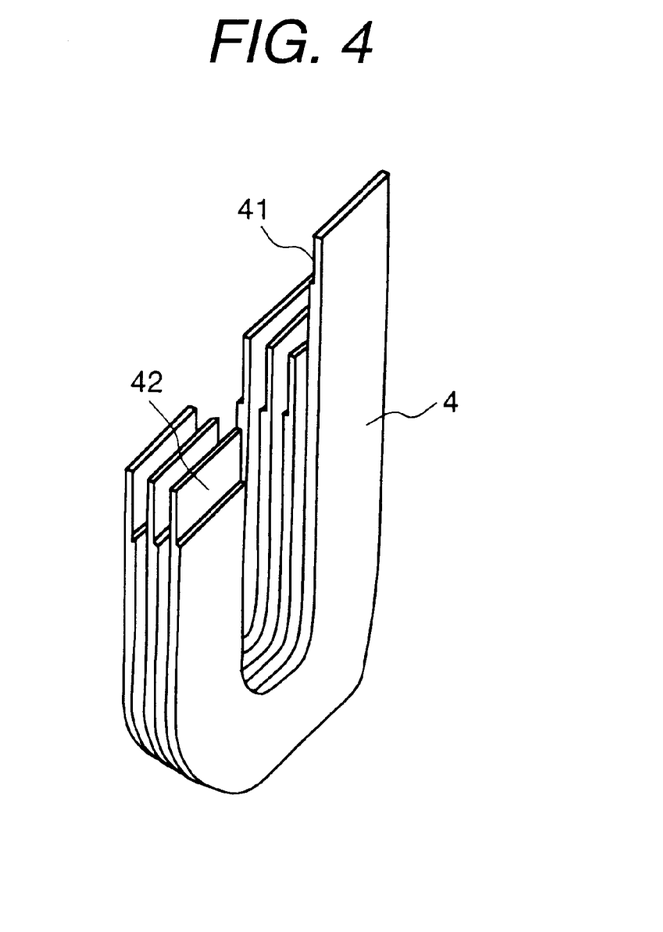
FIG. 4 is an explanatory view for explaining another embodiment for carrying out a stator coil according to the present invention.
Figure 5:
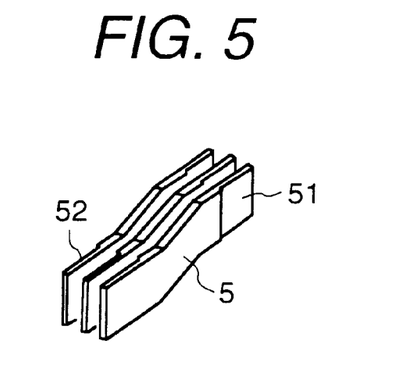
FIG. 5 is an explanatory view showing one thin plate rod shape chip according to the present invention.

And using a conventional jig member not shown in figure, as shown in FIG. 4, the stator coil is transformed into a U-shape configuration. On the other hand, using the straight angle line similarly to the coil, the thin plate connection chip 5 is transformed to have a stepwise portion having a substantially plate thickness correspondence against a flat face as shown in FIG. 5.

Figure 6:
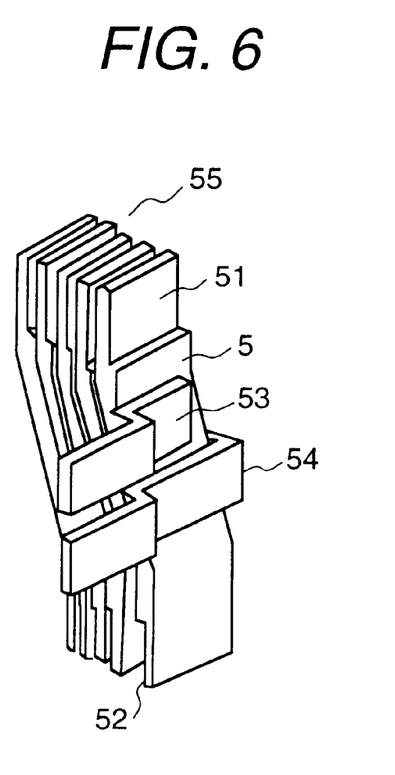
FIG. 6 is an explanatory view showing another thin plate rod shape chip according to the present invention.

And the thin plate connection chip 5 similarly to the stator coil 4 is reduced by half a plate thickness in a vicinity of the both end faces making the faces different as shown in a face 51 and a face 52. Further, to form a predetermined winding turn number, as shown in FIG. 6, plural thin plate connection groups 55 are constituted and, to a part of the thin connection chips of the above stated thin plate connection groups 55, a terminal 53 for an input use and a terminal 54 for connecting the same phases each other are provided.

Figure 7:
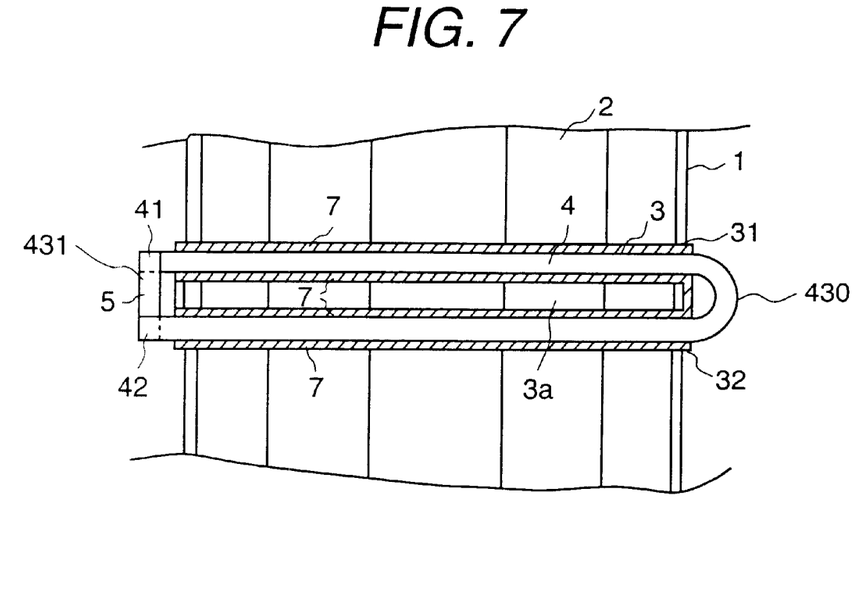
FIG. 7 is a partial cross-sectional view for explaining a condition in which the stator coil according to the present invention is inserted into a slot.

FIG. 7 shows a view in which the stator 1 is cut off in an axial direction in the slot portion 3, and a condition in which to the slot 3 the stator coil 4 is inserted will be explained. In the stator coil 4, through a slot insulating material 7, and by sandwiching the stator tooth portion 3a, the stator coil 4 is inserted into the adjacent slots 31, 32 and using the thin plate rod shape chip 5 between the face 41 of the side opposite the bight end and the face 42 is connected, accordingly one winding close circuit is constituted.

Figure 8:
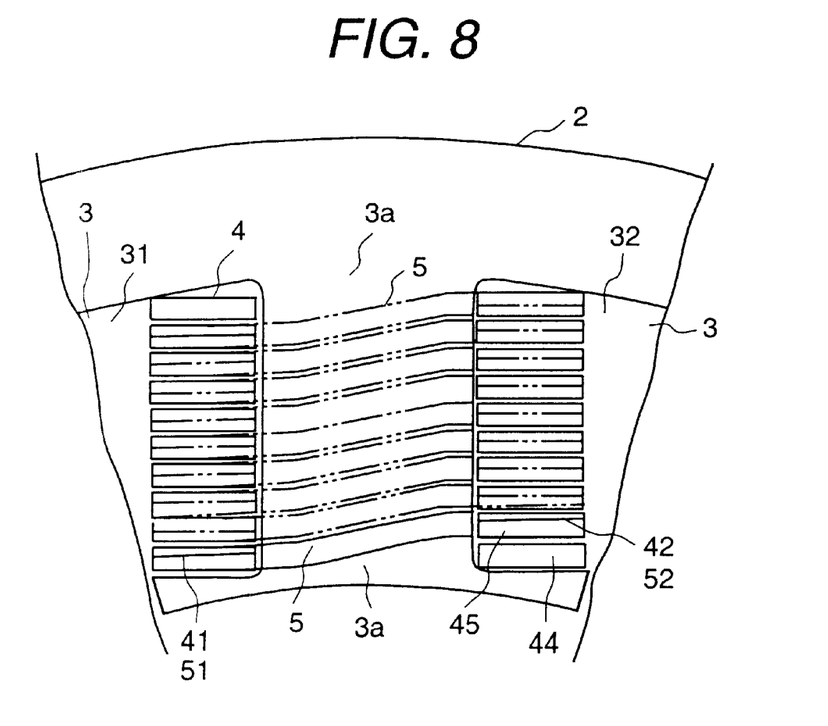
FIG. 8 is an explanatory view showing a connection between the stator coil according to the present invention and the thin plate connection chip.

Herein, to constitute the coil having a predetermined winging turn number, as shown in FIG. 8, when the coil is connected using the thin plate rod shape chip 5, one side linear line end of the U-shape coil 4, in other words when the coil is seen from the anti-U-shape side, and in a coil 44 when the right side coil 44 is an inlet of the current, a right side end 42 of the U-shape coil 45 which is positioned at just above this coil and the left side end 41 of the coil 44 are connected using the thin plate rod shape chip 5. Hereinafter, in similarly the connections are repeated, and a predetermined winding turn number is constituted to form.

Figure 9:
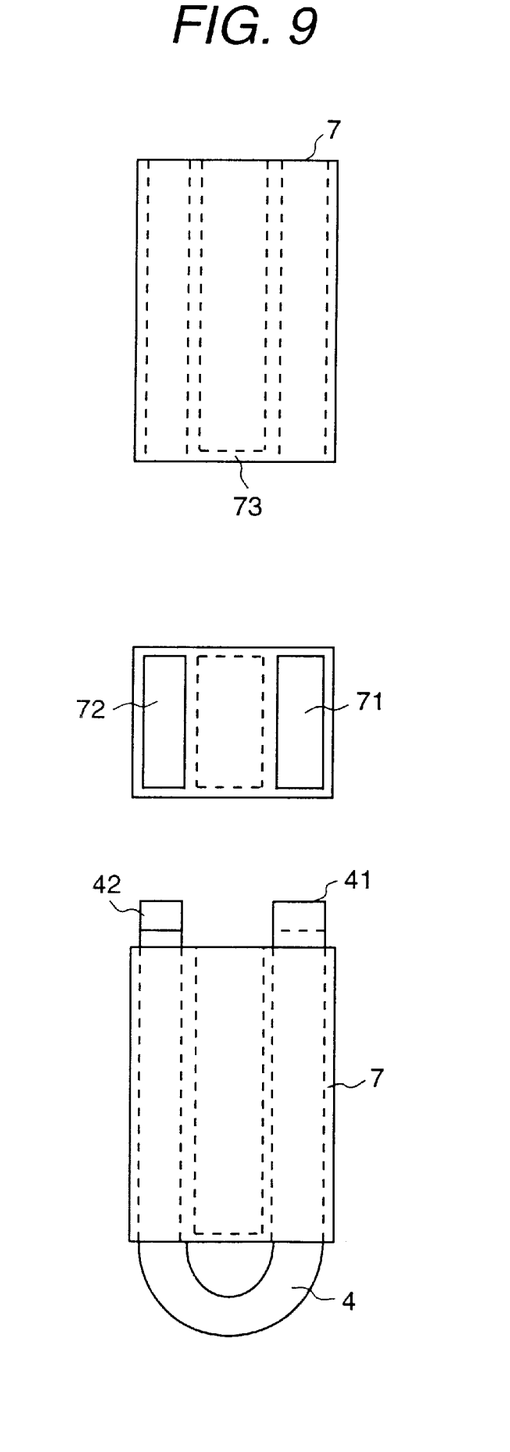
FIG. 9 is an explanatory view showing a slot insulating material of the stator coil according to the present invention.

FIG. 9 is an explanatory view for explaining the slot insulating material 7. As shown in FIG. 9, the slot insulating material 7 has a cross-sectional shape configuration in which, using an epoxy system insulating material 7, the slot insulating material is accommodated in an inner periphery of the slot 3 and is transformed to have a cylindrical form by inserting the linear portion of the coil to accommodating chambers 71 and 72 and then the linear portion of the coil is covered.

In a case where a straight angle line which is not subjected to perform the insulation, when the coil is piled up in the slot, between the coils the pile-up is carried out through an electric insulating material not shown in figure, after the predetermined number has piled up, the above stated slot insulating material 7 is mounted on the coil. Leaving this condition, the coil is inserted into the slot of the stator iron core, and as stated in above using the thin connection chip 5 the coil is connected.

Figure 10:
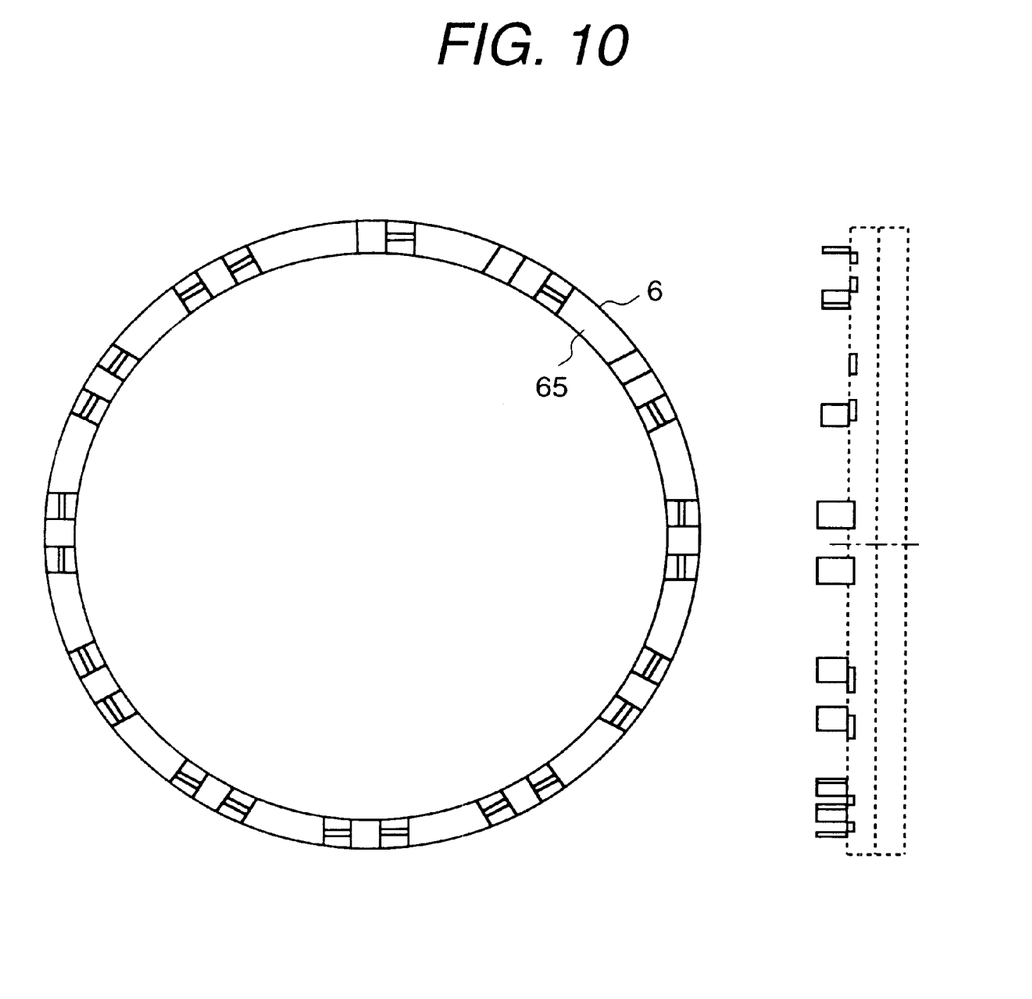
FIG. 10 is an explanatory view showing one embodiment for carrying out a connection ring according to the present invention.
Figure 11:
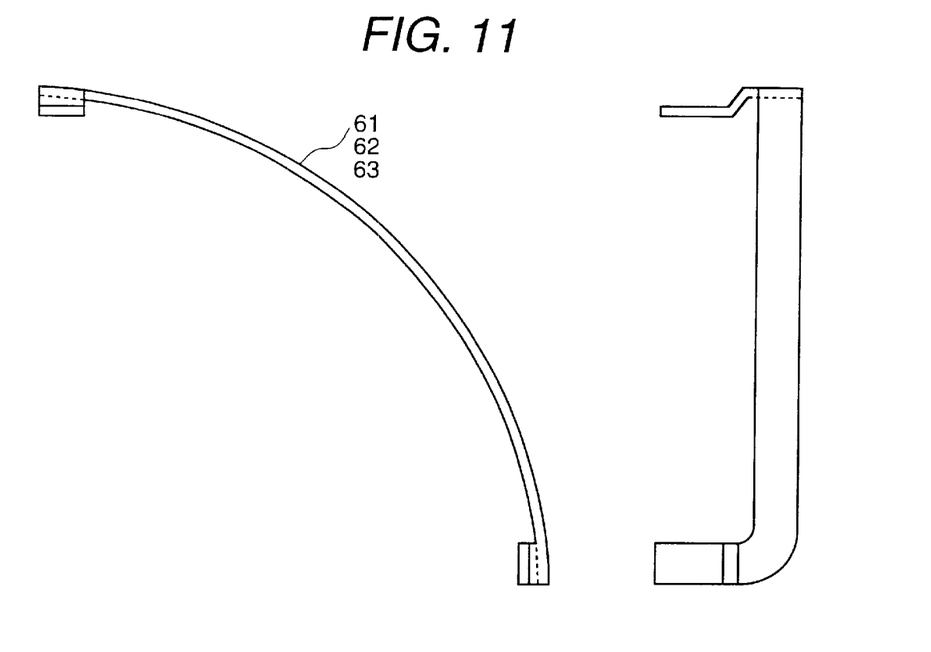
FIG. 11 is an explanatory view showing another embodiment for carrying out a connection ring according to the present invention.
Figure 12:
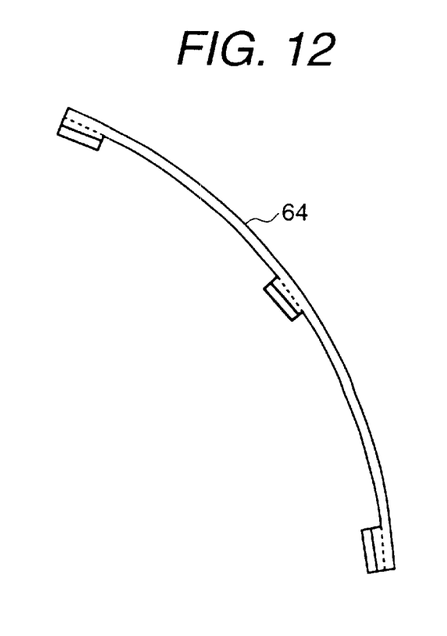
FIG. 12 is an explanatory view showing a further embodiment for carrying out a connection ring according to the present invention.
Figure 13:
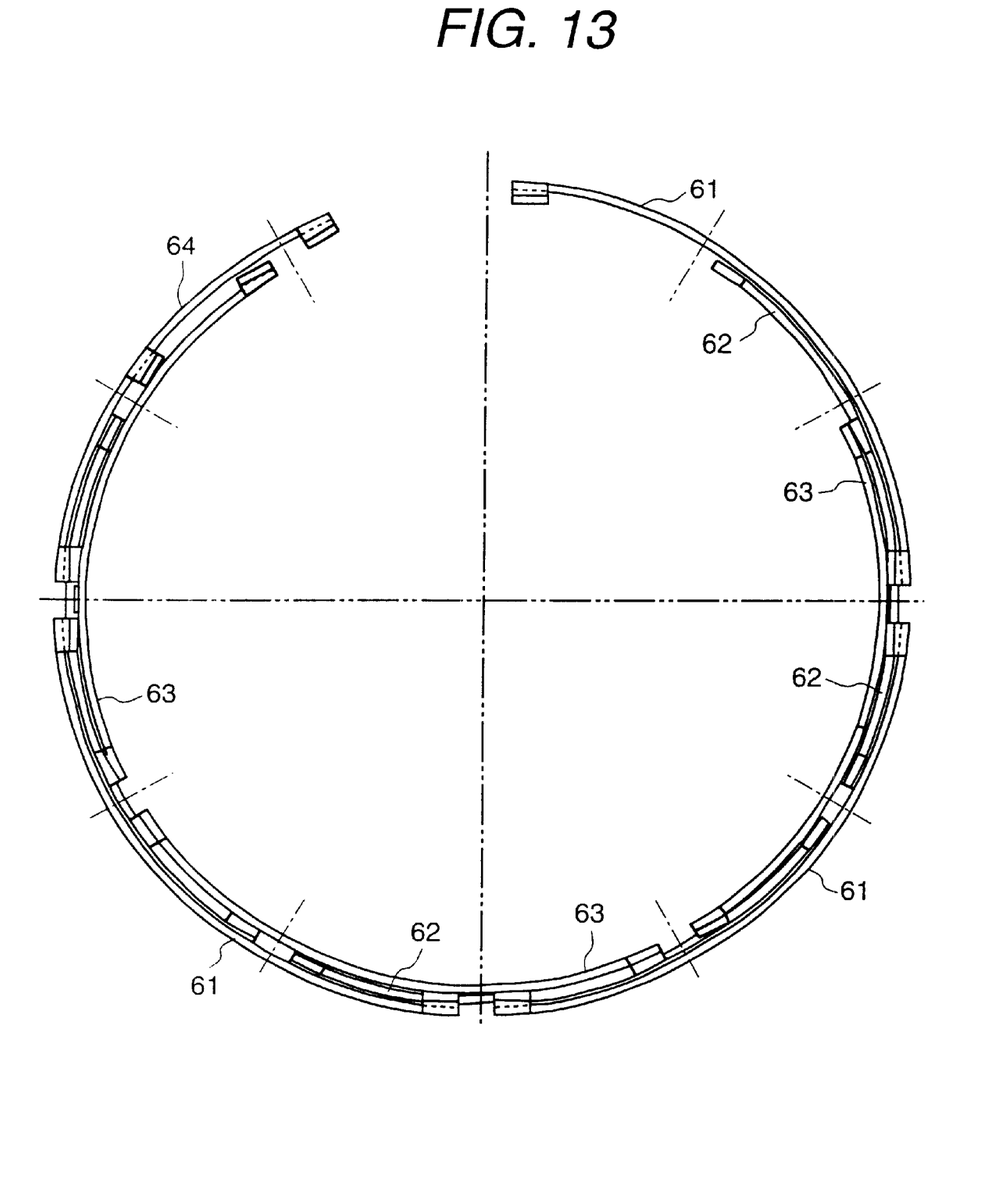
FIG. 13 is an explanatory view showing a still further embodiment for carrying out a connection ring according to the present invention.

Next, FIG. 10 is an explanatory view showing a construction of the connection ring 6. The connection ring 6 of the carrying-out embodiment according to the present invention will be explained an example in which it is constituted according to Y-connection having the three phases. First of all, U-phase 61, V-phase 62, W-phase 63 are formed with a shape configuration shown in FIG. 11, a neutral line 64 is formed as shown in FIG. 12 and they are assembled and constituted as shown in FIG. 13.

Figure 14:
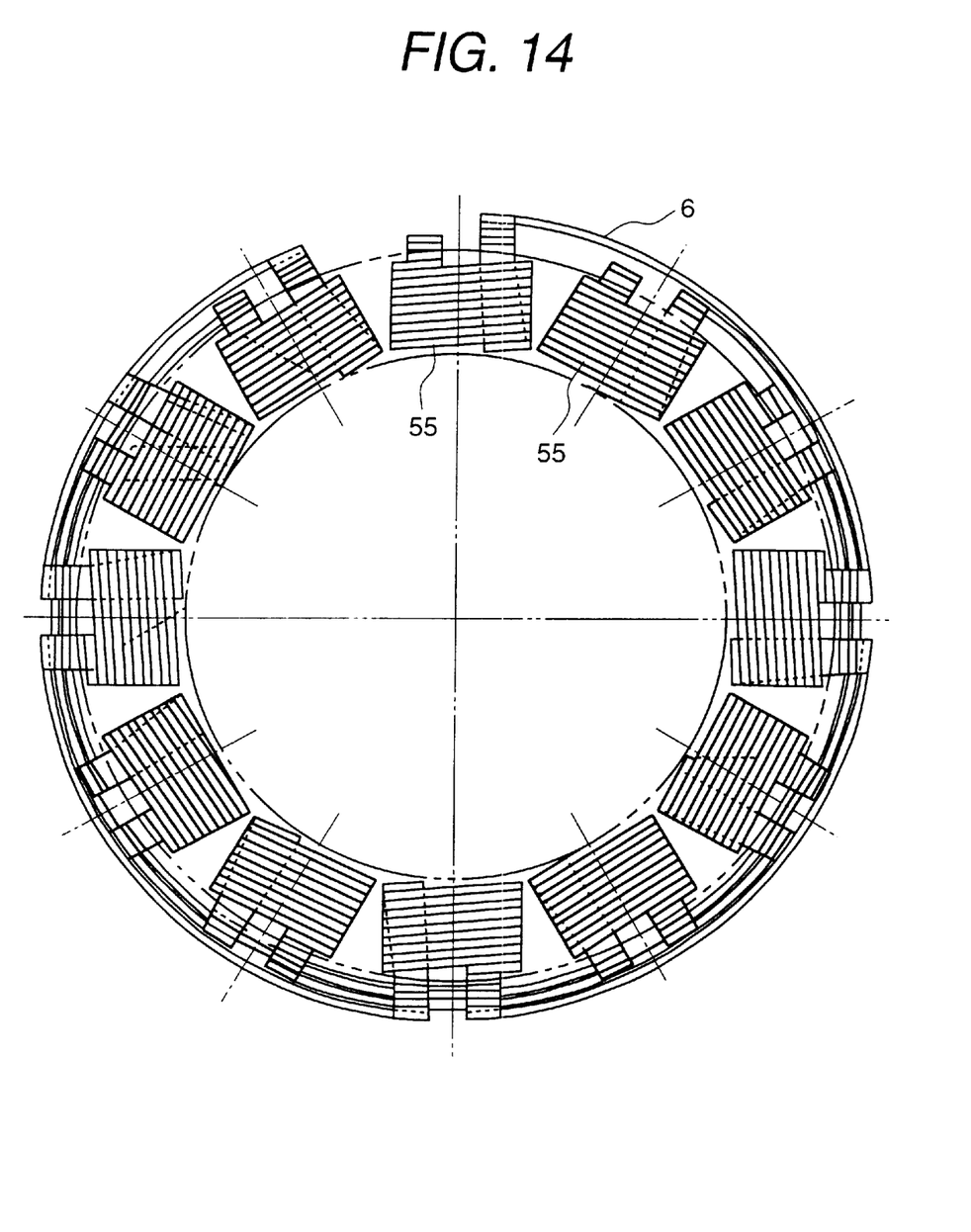
FIG. 14 is an explanatory view showing one embodiment of a connection condition between the connection ring coil according to the present invention and the thin plate rod shape chip.

And, they are assembled to a mold not shown in figure, using an epoxy resin 65, they are transformed integrally, then the connection ring 7 is constituted. An outer appearance view of the connection ring 7 is shown in FIG. 10. This connection ring 6 is connected to the one side of the thin plate connection chip of the stator coil as shown in FIG. 14 and then the stator is constituted to have the desired connection.

Figure 15:
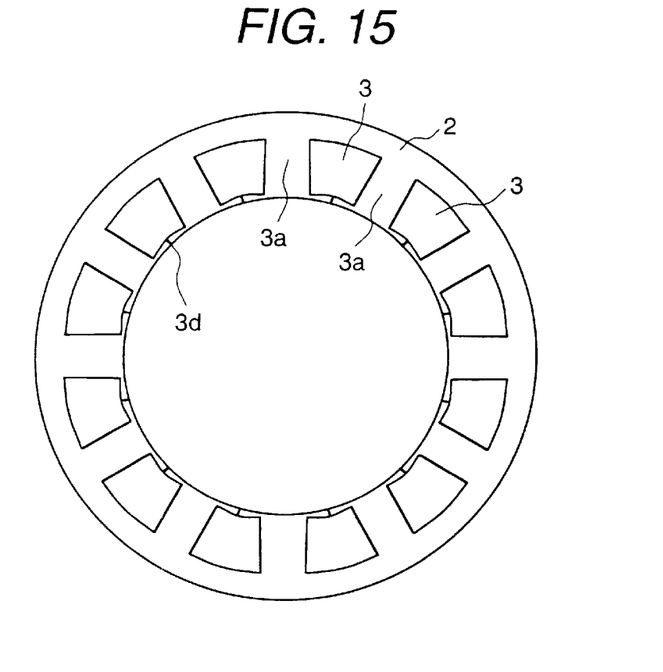
FIG. 15 is an explanatory view showing one embodiment of a stator iron core according to the present invention.

Next, the stator iron core will be explained. The stator iron core has a shape configuration as shown in FIG. 15 and the characteristic of the carrying-out embodiment according to the present invention is that a width of an opening 3d of the slot 3 is not depend on the wire diameter of the coil and it can be formed with a minimum width which is effective on the performances of the rotating electric machine.

In the prior art, since the coil is introduced to the slot from the opening 3d, the opening width is determined from a limitation from a manufacturing aspect rather than from the performance aspect.

However, according to the carrying-out embodiment of the present invention, since it is unnecessary to insert the coil from the opening 3d, the limitation from the manufacturing aspect is not suffered, as a result it is possible to employ the most suited size from the performance aspect of the rotating electric machine and then the effects of the performance improvement can be obtained.

Since the carrying-out embodiment according to the present invention is constituted with the above, the object according to the present invention can be attained fully. The reasons why since a coil end 430 of the stator coil 4 is, as clearly shown in FIG. 7, the peripheral direction interval between the slots in which the coil is inserted, in other words it becomes a semi-circle shape configuration which is formed with the diameter corresponding to the one slot pitch, the axial direction length can be shortened fully in comparison with that of the prior art.

As to a coil end 431 of another end, the both ends 41 and 42 of the stator coil 4 are connected with the linear shape by the thin plate rod shape chip, as the axial direction length it becomes the shortest length. Accordingly, the stator having the short coil end can be provided.

According to the present invention, since it is not carry out the compulsive transformation using the outside force shown in the prior art, further since there is no afraid of the damage of the coil and the slot insulating material, the stator having no insulation failure and having the good performances can be provided.

To improve further the electric insulation withstanding force, the carrying-out embodiment is effective remarkably, namely, in the condition where the stator coil 4 is inserted into the slot insulating material 7, it is molded using the epoxy system thermal hardening resin. And the carrying-out embodiment has effectively, namely the thin plate rod shape chip groups 55 are molded in similarly and the predetermined connection with the coil is carried out, finally at the time point when the connection ring 6 is connected, again the whole coil is molded.

Figure 16:
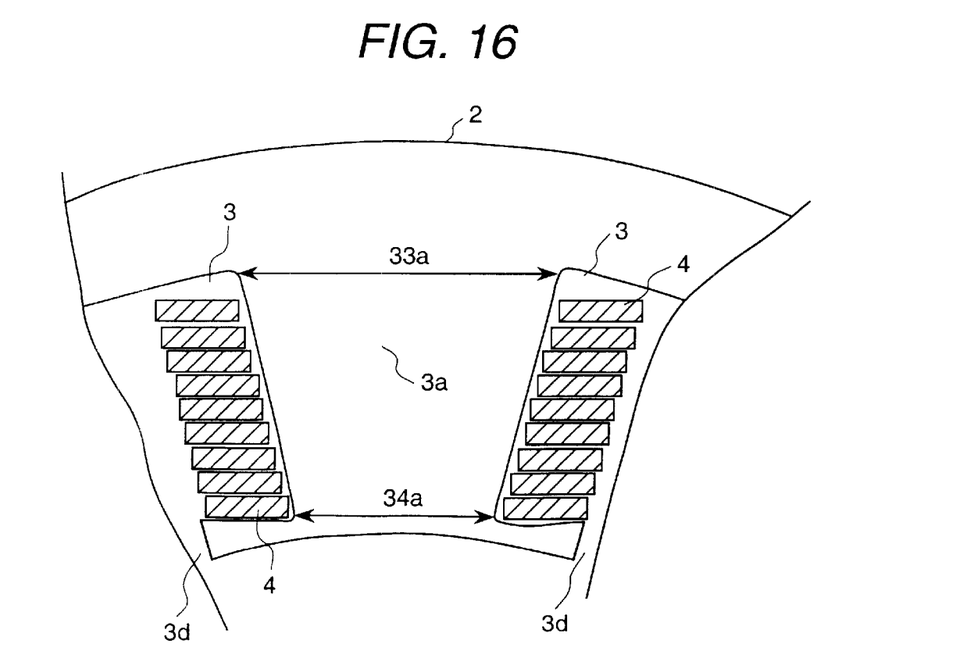
FIG. 16 is an explanatory view showing another embodiment of a stator.

Further, as shown in FIG. 16, as to the stator iron core tooth portion 3a, since it is formed to a portion 33a near to the outer diameter widely, a portion 34a near to the inner diameter narrow, a tooth width of the tooth portion is formed widely on average, the effects in which the magnetic flux density is lowered and then the iron loss is reduced can be obtained.

Figure 17:
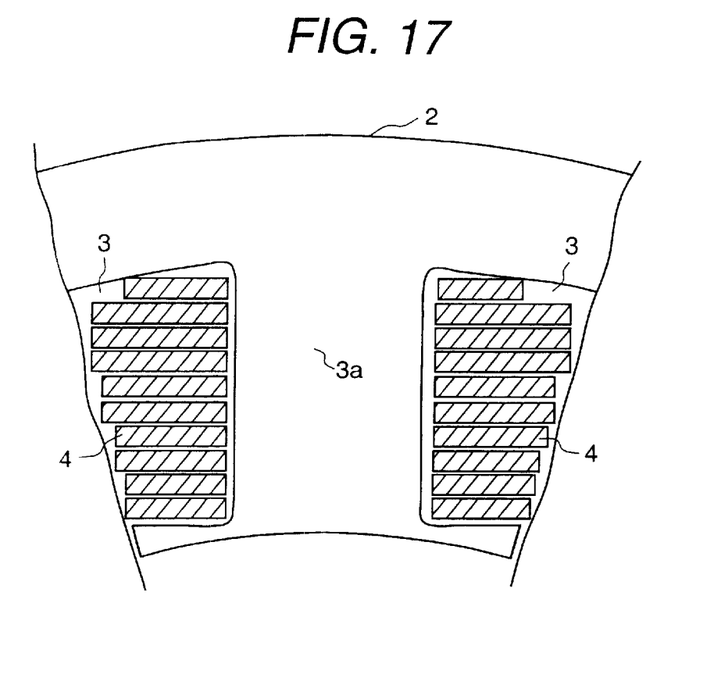
FIG. 17 is an explanatory view showing a further embodiment of a stator.

FIG. 17 shows a carrying-out embodiment on which the tooth width is not changed but the width of the coil is broadened. According to this manner, since the current density of the coil is lowered and the copper loss is reduced, then the effect for improving the efficiencies can be obtained.

Figure 18:
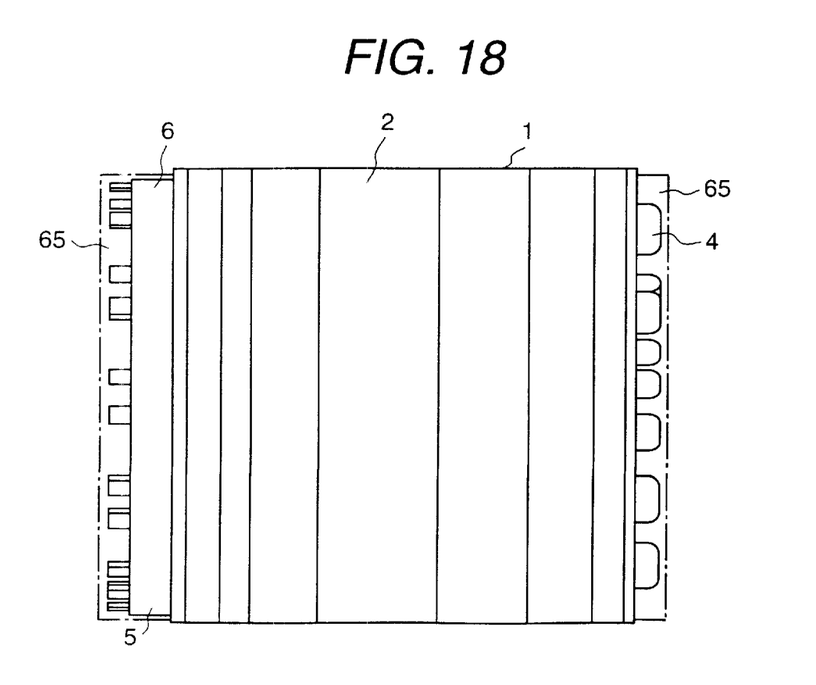
FIG. 18 is an explanatory view showing a molded stator.
Figure 19:
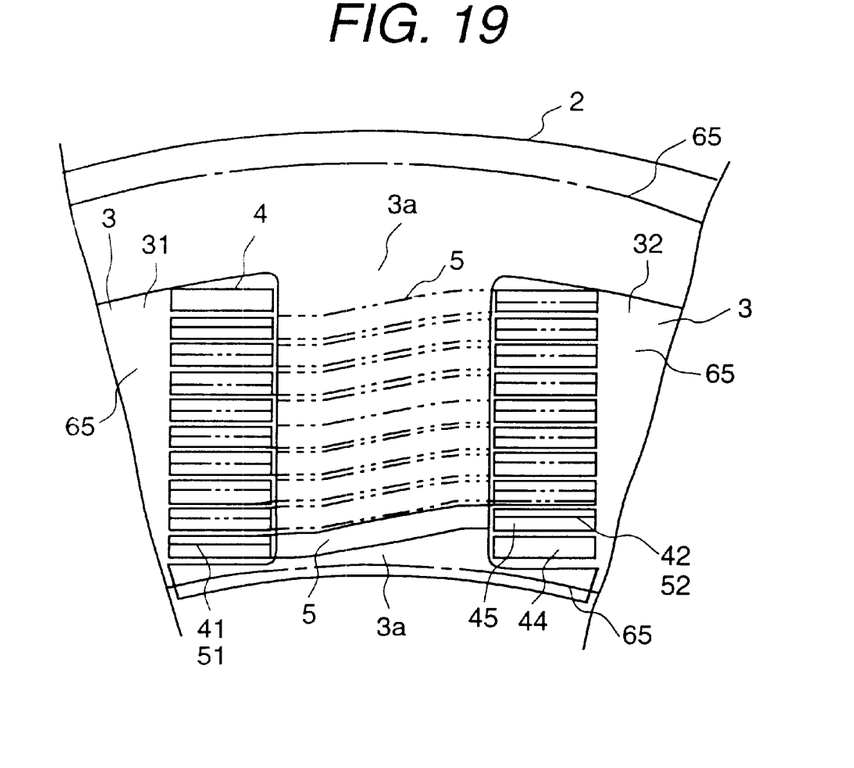
FIG. 19 is an explanatory view showing a vicinity of the molded stator.
Figure 20:
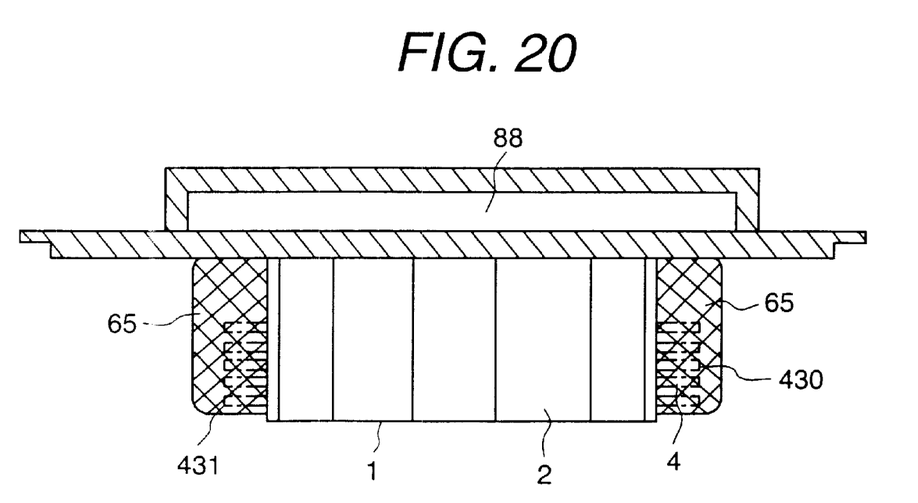
FIG. 20 is an explanatory view showing the molded stator for mounting to a frame.

FIG. 18 shows a condition the whole stator 1 is molded using the thermal hardening characteristic epoxy resin 65 with a virtual line. As shown in FIG. 19, in particularly a space except for the coil in the slot 3 is performed by the molding to fill up by the epoxy resin 65. Further, as shown in FIG. 20, when the stator 1 is mounted on a frame 8 of the rotating electric machine, the molding material for covering the coil ends 430 and 431 of the stator coil 4 is formed to contact to the inner periphery of the above stated frame 8.

With the above stated formation, the joule heat which is generated by flowing the current to the coil 4 is conducted to the molding material which is filled up to the slot, and further conducted to the molding material which covers the coil ends and transmitted to the frame. When the rotating electric machine is constituted with a water-cooling, to the frame a cooling water passage 88 is formed, the generated heat is cooled effectively. According to the present invention, with the above stated construction, the object according to the present invention can be attained effectively.

According to the present invention, since the length of the coil end portion of the stator coil can be shortened substantially, the resistance and the reactance can be made small, the superior performance rotating electric machine having the reduced copper amount, the small size, the light weight and the small insulation lowering can be achieved.

What is claimed is:

1. In a stator of a rotating electric machine in which a stator coil is mounted on plural slots of a stator iron core, comprising a linear-shaped stator coil that has been preformed to a U-shape configuration with straight sides and a bent portion, a tooth portion of said stator is sandwiched between said straight sides, after said straight sides are inserted to adjacent slots, and a thin plate rod-shaped chip is connected between both free ends of said linear-shaped stator coil to form a winding close circuit;

said linear-shaped stator coil having a predetermined turn number;

said free ends of said straight side and said thin plate rod shape chip are overlappingly connected;

a thickness in a portion in which said free ends and said chip are overlapped is reduced by half, respectively, so as to have a plate thickness which corresponds to a plate thickness of said linear-shaped stator coil;

in a face in which said plate thickness is reduced by half, in one side of one end of said linear-shaped stator coil, a plate thickness directed toward an inner diameter of said stator is reduced by half, in another side of said one end of said linear-shaped stator coil, a plate thickness directed toward an outer diameter of said stator is reduced by half;

said thin plate rod shape chip having a face with a plate thickness reduced by half;

said straight sides of said U-shape configuration coil sandwich said thin plate rod shape chip.

2. In the stator of a rotating electric machine according to claim 1, wherein said linear-shaped stator coil having an uninsulated straight line portion, said linear-shaped stator coil is laminated between said straight sides in a radial direction of said stator iron core;

a coil-accommodating member is comprised of an epoxy system insulation material and formed with a cross-section shape in which said coil-accommodating member is adhered to an inner periphery of said linear-shaped stator coil and said coil-accommodating member is formable with a cylindrical shape;

said straight sides of said linear-shaped stator coil is insertable into said coil accommodating member;

said linear-shaped stator coil is molded with an epoxy system thermal hardening resin;

said thin plate rod shape chip is repeated to a predetermined number molded thin plate rod shape chips; and said linear-shaped stator coil and said thin plate rod shape chips are overlappingly connected to form a predetermined turn number of said linear-shaped stator coil.

3. In the stator of a rotating electric machine according to claim 1, wherein after said stator iron core, said linear-shaped stator coil and a connection ring are constituted of a predetermined construction, a complete stator is molded with a thermal hardening characteristic epoxy resin;

a space, except for said linear-shaped stator coil in said slot, is filled with said epoxy resin; and with said stator mounted on a frame of the rotating electric machine, a molding material is provided for covering a coil end portion of said linear-shaped stator coil and contacting an inner periphery of said frame.

4. In the stator of a rotating electric machine according to claim 1, wherein said stator core has teeth, each of which teeth has an outer diameter portion wider than an inner diameter portion.

5. In the stator of a rotating electric machine according to claim 1, wherein said stator is constituted by said linear-shaped stator coil in which a width of said linear-shaped stator coil for inserting into said slot widens from an inner diameter side of said stator to an outer diameter side of said stator.

* * * * *